US009855538B2

(12) United States Patent
Suslick et al.

(10) Patent No.: US 9,855,538 B2
(45) Date of Patent: Jan. 2, 2018

(54) ULTRASONIC METHOD AND APPARATUS FOR PRODUCING PARTICLES HAVING A CONTROLLED SIZE DISTRIBUTION

(71) Applicant: The Board of Trustees of the University of Illinois, Urbana, IL (US)

(72) Inventors: Kenneth S. Suslick, Champaign, IL (US); Bradley W. Zeiger, Portland, OR (US); Hyo Na Kim, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 246 days.

(21) Appl. No.: 14/772,255

(22) PCT Filed: Mar. 4, 2014

(86) PCT No.: PCT/US2014/020136
§ 371 (c)(1),
(2) Date: Sep. 2, 2015

(87) PCT Pub. No.: WO2014/137982
PCT Pub. Date: Sep. 12, 2014

(65) Prior Publication Data
US 2016/0008782 A1 Jan. 14, 2016

Related U.S. Application Data

(60) Provisional application No. 61/774,968, filed on Mar. 8, 2013.

(51) Int. Cl.
*B01J 2/18* (2006.01)
*A61K 9/14* (2006.01)
(Continued)

(52) U.S. Cl.
CPC . *B01J 2/18* (2013.01); *A61J 3/02* (2013.01); *B05B 17/063* (2013.01); *B05B 7/0012* (2013.01); *B05B 17/0676* (2013.01)

(58) Field of Classification Search
None
See application file for complete search history.

(56) References Cited

U.S. PATENT DOCUMENTS 5,471,001 A    11/1995    Anderson et al.
5,606,297 A    2/1997    Phillips
(Continued)

FOREIGN PATENT DOCUMENTS

WO    WO 00/32597 A1    6/2000
WO    WO 03/035035 A1    5/2003
(Continued)

OTHER PUBLICATIONS

Abbas, A. et al., "Sonocrystallisation of Sodium Chloride Particles for Inhalation," *Chemical Engineering Science*, 62 (2007) pp. 2445-2453.
(Continued)

*Primary Examiner* — Mary F Theisen
(74) *Attorney, Agent, or Firm* — Brinks Gilson & Lione

(57) ABSTRACT

An ultrasonic apparatus for producing particles of a pharmaceutical agent or other material comprises a flow-through ultrasonic horn comprising an inlet, an outlet, and an interior channel that connects the inlet to the outlet for flow of a fluid therethrough. The ultrasonic horn is connectable to a transducer, and a crystallization tube is adjacent to the ultrasonic horn. The crystallization tube comprises an inlet port and outlet port for flow of an antisolvent therethrough, and it further includes a side access port. The outlet of the ultrasonic horn is inserted into the side access port so as to be in fluid communication with the crystallization tube.

20 Claims, 6 Drawing Sheets

(51) Int. Cl.
  *B05B 17/06*   (2006.01)
  *A61J 3/02*    (2006.01)
  *B05B 7/00*    (2006.01)

(56) References Cited

U.S. PATENT DOCUMENTS

| | | | |
|---|---|---|---|
| 6,302,958 | B1 | 10/2001 | Lindrud et al. |
| 7,041,144 | B2 * | 5/2006 | Kozyuk ............... B01D 9/005 23/295 R |
| 7,128,784 | B2 | 10/2006 | Rauls et al. |
| 2002/0000681 | A1 | 1/2002 | Gupta et al. |
| 2002/0054892 | A1 | 5/2002 | Garijo et al. |
| 2004/0026804 | A1 | 2/2004 | Gupta et al. |
| 2004/0045805 | A1 | 3/2004 | Lancaster et al. |
| 2004/0156911 | A1 | 8/2004 | Chattopadhyay et al. |
| 2009/0087492 | A1 | 4/2009 | Johnson et al. |
| 2011/0288060 | A1 | 11/2011 | Ruecroft et al. |
| 2012/0046258 | A1 | 2/2012 | Cross et al. |
| 2014/0242514 | A1 * | 8/2014 | Inoue ............... G03G 9/0804 430/137.22 |

FOREIGN PATENT DOCUMENTS

| | | |
|---|---|---|
| WO | WO 03/057717 A2 | 7/2003 |
| WO | WO 03/061816 A1 | 7/2003 |
| WO | WO 03/092851 A1 | 11/2003 |
| WO | WO 03/101577 A1 | 12/2003 |
| WO | WO 2004/034943 A2 | 4/2004 |
| WO | WO 2005/004847 A1 | 1/2005 |
| WO | WO 2009/131930 A1 | 10/2009 |
| WO | WO 2011/106565 A1 | 9/2011 |

OTHER PUBLICATIONS

Dennehy, R. D. et al., "Particle Engineering Using Power Ultrasound," *Organic Process Research & Development*, 7 (2003) pp. 1002-1006.

Dhumal, R. S. et al., "Particle Engineering Using Sonocrystallization: Salbutamol Sulphate for Pulmonary Delivery," *International Journal of Pharmaceutics*, 368 (2009) pp. 129-137.

Guo, Z. et al., "Effect of Ultrasound on Anti-Solvent Crystallization Process," *Journal of Crystal Growth*, 273 (2005) pp. 555-563.

Luque de Castro, M. D., et al., "Ultrasound-Assisted Crystallization (sonocrystallization)," *Ultrasonics Sonochemistry*, 14 (2007) pp. 717-724.

Ruecroft, G. et al., "Sonocrystallization: The Use of Ultrasound for Improved Industrial Crystallization," *Organic Process Research & Development*, 9 (2005) pp. 923-932.

International Search Report and Written Opinion for International Patent Application No. PCT/US2014/020136 dated Jun. 12, 2014, 11 pages.

* cited by examiner

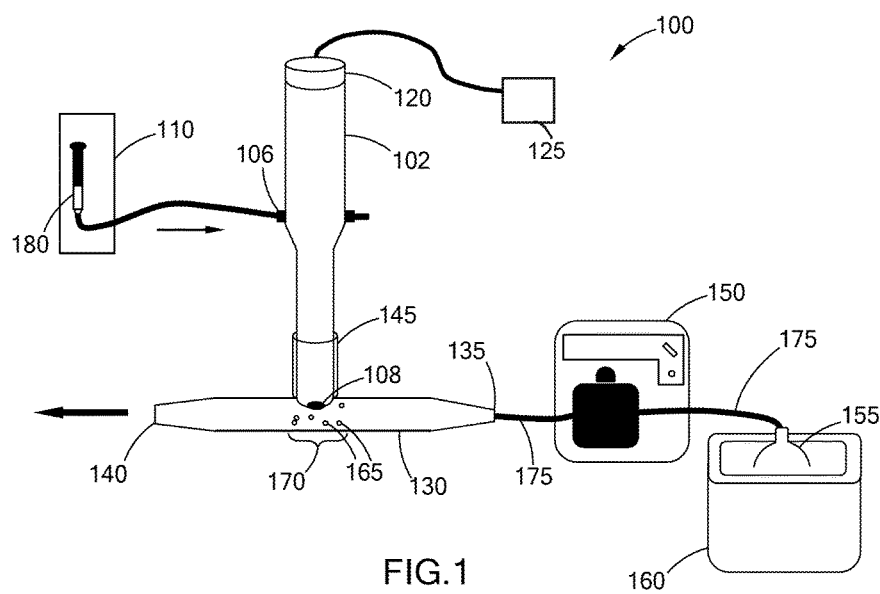
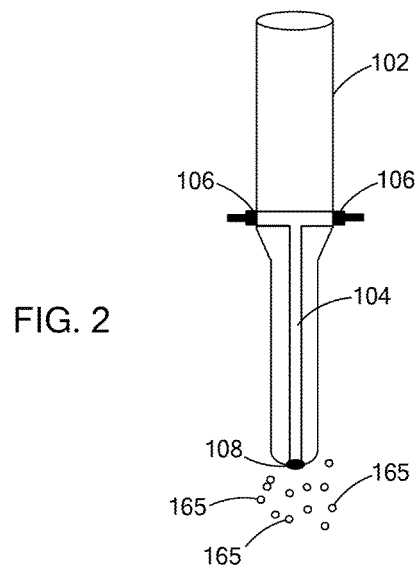
FIG. 1
FIG. 2

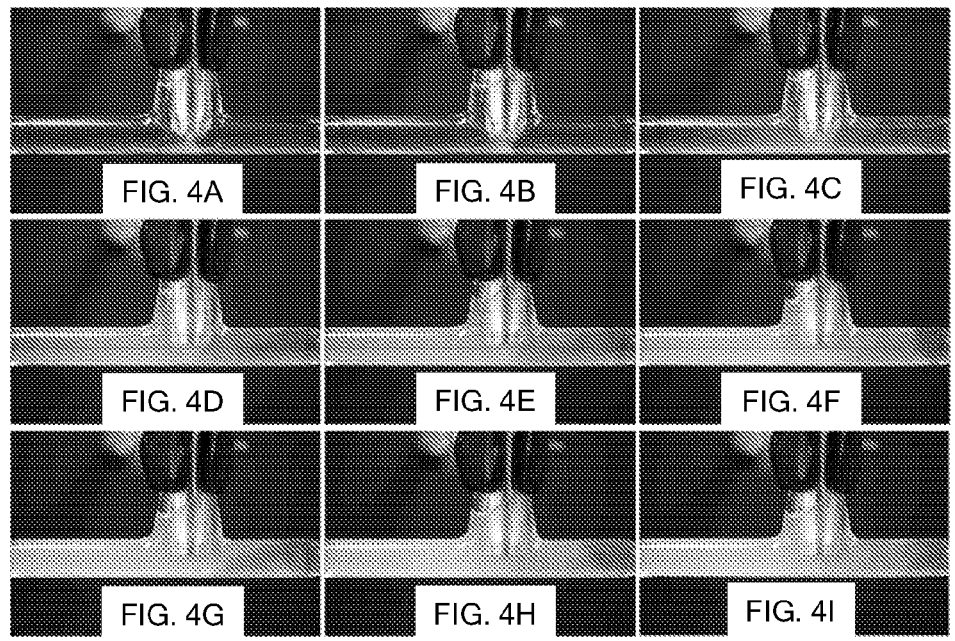
FIG. 4A  FIG. 4B  FIG. 4C
FIG. 4D  FIG. 4E  FIG. 4F
FIG. 4G  FIG. 4H  FIG. 4I
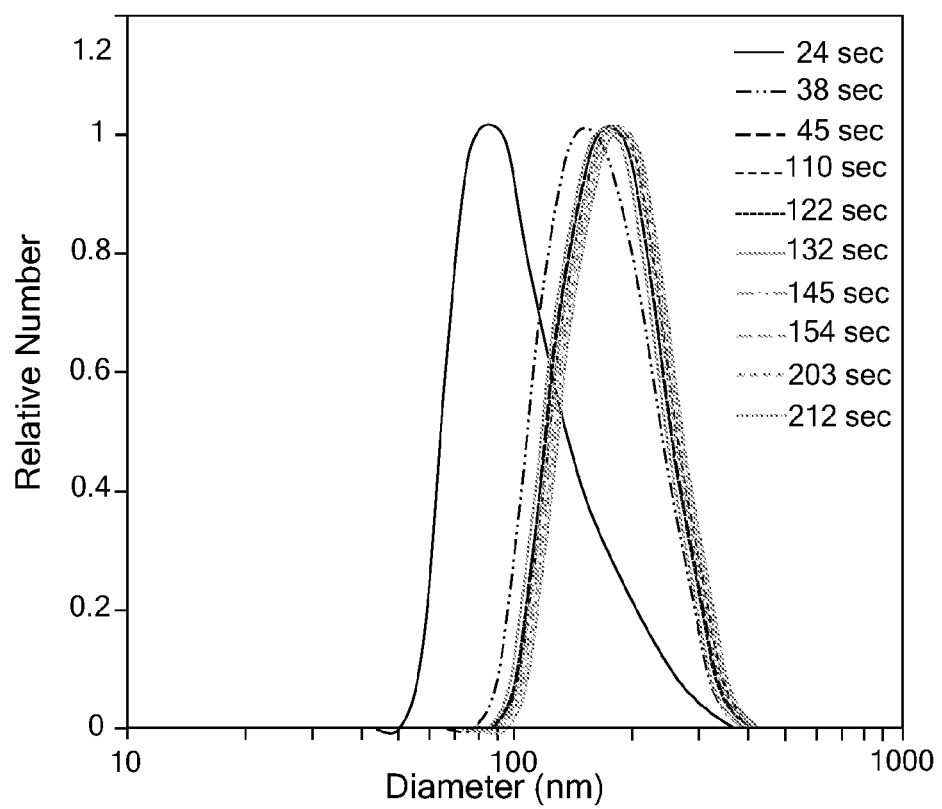
FIG. 5A

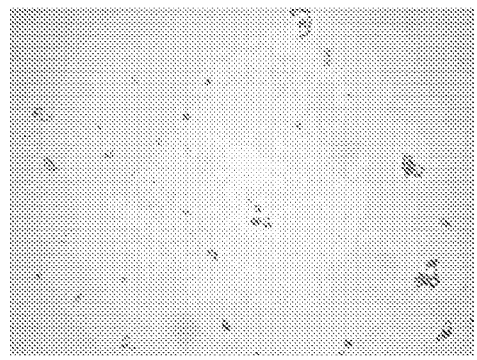 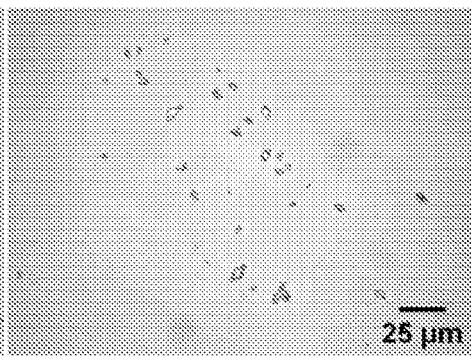
FIG. 6A  FIG. 6B
FIG. 7A  FIG. 7B
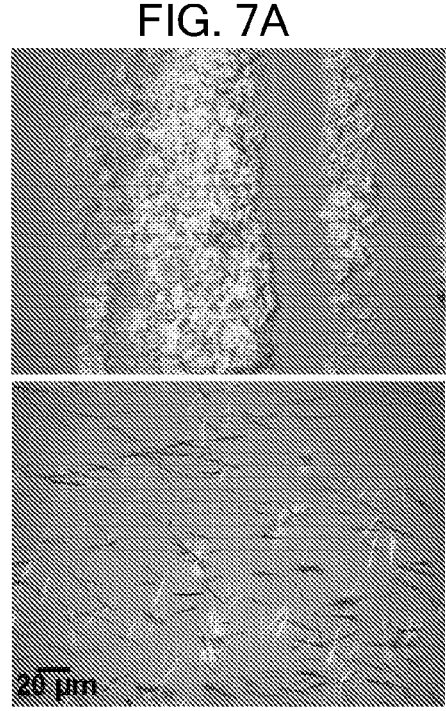 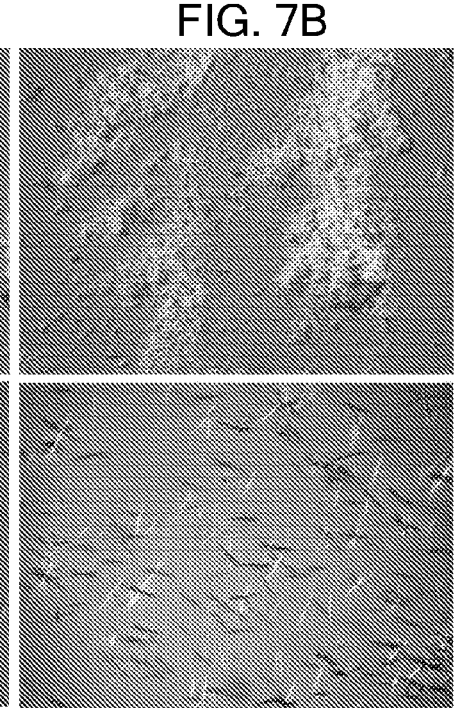
FIG. 7C  FIG. 7D

ULTRASONIC METHOD AND APPARATUS FOR PRODUCING PARTICLES HAVING A CONTROLLED SIZE DISTRIBUTION

RELATED APPLICATIONS

The present patent document is the national stage of International Application No. PCT/US2014/020136, which was filed on Mar. 4, 2014, and which claims the benefit of the filing date under 35 U.S.C. §119(e) of U.S. Provisional Patent Application Ser. No. 61/774,968, which was filed on Mar. 8, 2013. Both of the aforementioned applications are hereby incorporated by reference in their entirety.

FEDERALLY SPONSORED RESEARCH OR DEVELOPMENT

This invention was made with government support under contract number DMI-0906904 awarded by the National Science Foundation. The U.S. government has certain rights in this invention.

TECHNICAL FIELD

The present disclosure is related generally to particle crystallization and more particularly to an ultrasonic method and apparatus for producing particles that may have application as pharmaceutical agents.

BACKGROUND

Particle size distributions are extremely important in the preparation of pharmaceutical materials. Dissolution profiles of orally-ingested drugs, for instance, strongly depend on available surface area. It is estimated that about 40% of drugs fail in development due to difficulties in pharmacokinetics, most commonly related to their solubility properties. This is perhaps not surprising; in order to be effective, a drug typically has to be able to cross cell membranes, requiring a certain degree of lipophilicity. Solubility in the body, on the other hand, requires hydrophilicity. Controlling the surface area of particles in order to expedite the solvation of partly hydrophobic particles is one way to help combat the solubility problem.

There are many other reasons why controlling particle size is important to the pharmaceutical industry. Aerosol drugs, for example, are often delivered as suspensions of particles (metered-dose inhalers) or as dry powders (dry powder inhalers). Large particles may be unable to "make the turn" and may lodge in the back of the throat rather than continue on to the lungs. Particles hitting the throat in this way are more likely to be responsible for undesirable side effects than to deliver a therapeutic benefit. If the particles are too small they do not settle in the lungs before exhalation and are simply expelled from the body. There is a narrow size distribution, therefore, that is considered acceptable for aerosol drug materials, usually reported as an aerodynamic diameter of about 0.5-5 μm.

Parenteral drugs delivered by intravenous, subcutaneous, or intramuscular injection may be slurries of particles or emulsions rather than solutions. The particle size of the drug may influence the rate of release, and in the case of intravenous injection it is critical that particles are not larger than about 5 μm; otherwise, the patient may suffer a potentially fatal pulmonary embolism. Particle size is also important for other drug delivery methods, such as buccal delivery and rectal delivery.

Despite the importance of controlling the particle size of pharmaceutical agents, industrial-scale approaches to synthesizing drug particles are generally unsatisfactory. It is common to micronize large crystals mechanically by jet milling, wet or dry milling, or similar techniques. However, these methods have a number of shortcomings, including producing broad crystal size distributions with nonuniform morphologies, introducing defects (which may influence shelf life and solubility profile), inducing phase changes among polymorphs, producing amorphous materials, and/or causing electrostatic charging and agglomeration. Drug particles subjected to such mechanical methods are commonly waxy solids that reagglomerate badly after milling.

It would be advantageous to be able to prepare high surface area drug crystals and other particles in a controlled process without the need for post-crystallization modification.

BRIEF SUMMARY

Described herein an improved ultrasonic method and apparatus for preparing high surface area particles of pharmaceutical agents and other organic or inorganic materials.

The method comprises driving an ultrasonic horn at a resonance frequency thereof, the ultrasonic horn comprising an inlet, an outlet and an interior channel connecting the inlet to the outlet for passage of a fluid therethrough; delivering a solution comprising solute and a solvent into the inlet while the outlet is immersed in a continuous flow of antisolvent, the solution flowing through the interior channel and into the antisolvent; ultrasonically dispersing the solution in the antisolvent, thereby forming nucleation sites comprising the solute; and forming particles comprising the solute at the nucleation sites. The solute may be a pharmaceutical agent, according to one embodiment.

The apparatus includes a flow-through ultrasonic horn comprising an inlet, an outlet, and an interior channel connecting the inlet to the outlet for flow of a fluid therethrough. The ultrasonic horn is connectable to a transducer, and a crystallization tube is adjacent to the ultrasonic horn. The crystallization tube comprises an inlet port and outlet port for flow of an antisolvent therethrough and further includes a side access port. The outlet of the ultrasonic horn is inserted into the side access port so as to be in fluid communication with the crystallization tube.

BRIEF DESCRIPTION OF THE DRAWINGS

FIG. 1 is a schematic of an apparatus for preparing particles of a pharmaceutical agent or other material.

FIG. 2 shows a flow-through ultrasonic horn including an inlet, an outlet and interior channel connecting the inlet to the outlet.

FIGS. 4A-4I are images extracted from a video, where each frame is separated by 3 seconds, showing antisolvent sonocrystallization of aspirin. The progress is from left to right, starting at the top left-most frame. In the first two frames the horn is operating but no solvent has reached the continuous flow of antisolvent (water) yet; the slight cloudiness is from cavitating bubbles. Crystallization begins in the third frame.

FIG. 5A shows particle size distributions for aspirin produced by antisolvent sonocrystallization in a continuous flow of water, where the legend indicates how long the experiment was conducted before the sample was collected.

FIGS. 6A and 6B show microscale particles of acetaminophen prepared by antisolvent sonocrystallization in a continuous flow of hexanes.

FIGS. 7A-7B show submicron particles of folic acid prepared by antisolvent sonocrystallization in a continuous flow of 1 M HCl. The optical microscope images are at the same magnification as FIGS. 7C-7D.

FIGS. 7C-7D show microscale particles of folic acid prepared by antisolvent sonocrystallization in a continuous flow of 1 M $H_2SO_4$. The optical microscope images are at the same magnification as FIGS. 7A-7B.

DETAILED DESCRIPTION

Figure 3:
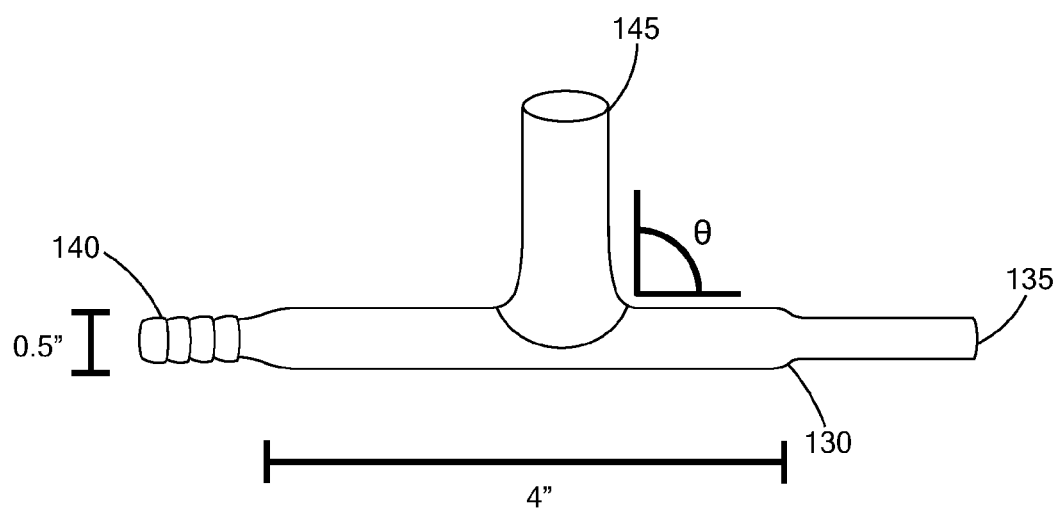
FIG. 3 is schematic of a flow-through crystallization tube.

The inventors have developed a new ultrasonic method of crystallizing high surface area particles of a variety of materials from precursor solutions. The new method uses a flow-through ultrasonic horn to effectively disperse a precursor solution, which may contain a drug such as aspirin, in a continuous flow of antisolvent, leading to nucleation and crystallization of micro- and/or nanoscale particles of the solute (e.g., aspirin). This new approach to antisolvent crystallization allows for temperature uniformity and control over the solvent/antisolvent concentration profile during particle sonocrystallization, which may enable more uniform particle size distributions and higher process reproducibility.

The application of antisolvent sonocrystallization under continuous flow conditions to the formation of several types of drug particles is described herein; however, the method is more broadly applicable to any material for which a suitable solvent/antisolvent system may be found (as described in more detail below). Also set forth herein is a novel apparatus that includes a flow-through ultrasonic horn in fluid communication with a crystallization tube to enable sonocrystallization to be carried out with a continuous flow of antisolvent.

As used herein, the phrase "in fluid communication with" means that two components (in this case an ultrasonic horn and a crystallization tube, as described in detail below) have a relative position that permits a fluid from one of the components to enter the other component. In other words, components that are in fluid communication with each other are configured to permit the passage of some or all of the fluid from one component to the other component. The components may be situated in close proximity to each other, in physical contact with each other, and/or secured together.

FIG. 1 shows a schematic of an apparatus 100 for preparing particles having a controlled size distribution. The apparatus 100 includes a flow-through ultrasonic horn 102 comprising an inlet 106 and an outlet 108 connected by an interior channel 104 (see FIG. 2) for passage of a fluid therethrough. A pump (e.g., a syringe pump) 110 may be connected to the inlet 106 of the ultrasonic horn to deliver the fluid into the interior channel 104. The fluid may be, for example, a drug solution comprising a pharmaceutical agent in a solvent, as discussed in greater detail below. The ultrasonic horn 102 is connectable to one or more transducers (e.g., piezoelectric or electrostrictive transducers) 120 powered by a power supply 125. There may be more than one inlet 106 and/or more than one outlet 108 of the ultrasonic horn 102.

Below the ultrasonic horn 102 is a crystallization tube 130 having an inlet port 135 and an outlet port 140 for flow of an antisolvent therethrough, and the tube 130 also includes a side access port 145. The outlet 108 of the ultrasonic horn 102 is inserted into the side access port 145 so as to allow fluid flow from the horn 102 to the crystallization tube 130. The outlet 108 of the ultrasonic horn 102 is therefore in fluid communication with the crystallization tube 130.

Referring to FIGS. 1 and 3, the side access port 145 may be an opening in the crystallization tube 130 of an appropriate size and shape to accommodate without leakage a bottom portion of the ultrasonic horn 130 containing the outlet 108. The side access port 145 may define an angle θ with respect to the inlet port 135 of the crystallization tube 130. In this example, the angle θ is about 90°, although other acute or obtuse angles are possible, such as from about 30° to about 150°, from about 45° to about 135°, or from about 60° to about 120°. A drug solution passing through the outlet 108 of the ultrasonic horn 102 and into the crystallization tube 130 is ultrasonically dispersed in the antisolvent 175, promoting the creation of nucleation sites from which drug particles 165 may form. The ultrasonic dispersion of the drug solution in the antisolvent 175 is induced by momentum transfer from the horn 102 to the solution during operation.

A pump (e.g., a peristaltic pump) 150 may be connected to the inlet port 135 of the crystallization tube 130 to drive the antisolvent through the tube 130 at a desired flow rate. A reservoir 155 may contain the antisolvent before it is delivered to the pump 145. Antisolvent contained in the reservoir 155 may be kept at a desired temperature by, for example, immersing the reservoir 155 in a fluid (e.g., water) bath 160.

A method of forming high surface area particles is now described. A flow-through ultrasonic horn (as shown for example in FIGS. 1 and 2A) comprising an inlet 106 and an outlet 108 connected by an interior channel 104 is driven at a resonant ultrasonic frequency thereof. A solution 180 comprising a solute and a solvent is delivered into the inlet 106 while the outlet 108 is immersed in a continuous flow of antisolvent. The solution flows through the interior channel and out of the outlet, and is ultrasonically dispersed in the antisolvent 175. Nucleation sites comprising the solute are formed as the solution is dispersed, and particles 165 comprising the solute crystallize at the nucleation sites.

The nucleation sites form in a mixing region 170 of the antisolvent 175 which may be adjacent to the outlet 108 of the ultrasonic horn 102. Advantageously, the process allows dispersion of the solute and nucleation and growth of dispersed particles 165 without requiring the use of a surfactant, although a surfactant may be employed if desired. The crystallized particles 165 may be removed from the antisolvent 175 downstream of the outlet 108 of the ultrasonic horn 102. The particles 165 may have an average primary particle (crystallite) size in the range of from about 0.01 micron (about 10 nm) to about 100 microns depending on the solute and process conditions, although the average primary particle size is more typically about 10 microns or less.

In static systems employing a reservoir of antisolvent instead of a continuous flow, the application of ultrasonic energy to the system induces a temperature increase that could negatively affect the particle size distribution and process reproducibility. In the present process, such a temperature increase may be reduced or eliminated by controlling the flow rate of the antisolvent. For example, the continuous flow of antisolvent may have a flow rate of at least about 25 mL/min, or at least about 45 mL/min. If the flow rate is too low, it may not be possible to offset the energy input by the ultrasonic horn and the temperature in the mixing region may increase. If the flow rate is too high, however, the mixing region may include an excessively high ratio of antisolvent to solvent that may in some cases negatively affect the particle size distribution. Typically, the flow rate of the antisolvent is from about 25 mL/min to about 85 mL/min, or from about 45 mL/min to about 65 mL/min. Accordingly, the solution being dispersed in the antisolvent may have a substantially constant temperature in the mixing region. However, the process may need to run for a short period of time to reach a steady state at which the temperature of the mixing region remains substantially constant.

In addition to temperature, a concentration ratio of the solvent to the antisolvent in the mixing region may remain substantially constant once a steady state has been reached. The period of operation time required to reach a steady state is typically from about 30 seconds to about 60 seconds, and may be from about 40 seconds to about 50 seconds.

The solution may be delivered into the inlet of the ultrasonic horn at a flow rate of at least about 1 mL/min, or at least about 2 mL/min. Based on observations of a flow-through horn operating in air, it is believed that low flow rates produce a diffuse cloud of droplets, whereas higher flow rates yield a more focused stream of the solution. Typically, the flow rate is no higher than about 10 mL/min. For example, the flow rate of the solution may be from about 2 mL/min to about 8 mL/min, from about 2 mL/min to about 6 mL/min, or from about 4 mL/min to about 6 mL/min.

The solute employed in the process may be any material for which a suitable solvent and antisolvent may be found. The suitability of a solvent/antisolvent system may be evaluated by comparing the solubility of the solute in the solvent with the solubility of the solute in the antisolvent. For example, the solute may have a first solubility in the solvent and a second solubility in the antisolvent, where a ratio of the first solubility to the second solubility is at least about 10:1, or at least about 100:1. A higher ratio may permit a higher particle yield to be achieved for a given concentration of solute in the solvent. Accordingly, the ratio may also be at least about 200:1 or at least about 400:1, but is typically no higher than about 800:1. As would be recognized by one of ordinary skill in the art, the solubility of solute in a given solvent may be represented in terms of milligrams of solute per milliliter of the solvent (mg/mL), and may be determined by HPLC or gravimetric analysis.

In the present process, the solute may have a concentration in the solvent of at least about 50 mg/mL, or at least about 75 mg/mL. The maximum concentration may be the saturation point of the solute in the solvent. Typical concentrations, which of course depend on the solute and the solvent, are from about 75 mg/mL to about 400 mg/mL.

The suitability of a solvent/antisolvent system may also be evaluated in terms of the miscibility of the solvent and the antisolvent. Advantageously, a solvent and antisolvent that are miscible are selected for use in the continuous flow process. The solvent and antisolvent can be said to be miscible if a homogeneous solution of the two can be formed in substantially all proportions. Miscibility is important to ensure that the solvent dissolves in the antisolvent; otherwise the solute may be isolated from the antisolvent and thus be unable to crystallize into particles.

As indicated above, the solute may be a pharmaceutical agent (drug). Examples of pharmaceutical agents that may be successfully prepared in the form of high surface area crystals or particles using the above-described process include, but are not limited to, the following: aerosol medications such as salbutamol and budesonide, oral analgesics such as aspirin and acetaminophen, or other pharmaceutical preparations requiring small particles or control of particle size distributions. The solvent employed in the process may be an organic solvent such as, for example, ethanol, methanol, acetone, ethyl acetate, or methylethyl ketone, or an aqueous solvent, such as, for example, pure water, acids, or bases to control solute protonation states for maximum solubility.

The flow-through ultrasonic horn may be driven at the resonance frequency by one or more piezoelectric (e.g., lead zirconate titanate) transducers that are powered by a power supply. The resonance frequency is typically in the range of from about 20 kHz to about 40 kHz and is determined in part by the size of the horn. In the examples here, the resonance frequency was 20 kHz. The power supply delivers a voltage to the transducers, which thereby expand and contract according to the piezoelectric effect. This in turn applies pressure to the horn. Sound propagates through the horn as a compression wave such that the horn alternates between contraction and expansion when operated. The inlet of the flow-through horn is positioned at an acoustic node and the outlet is positioned at an acoustic antinode. The horn has a tapered shape (e.g., see FIG. 2) to amplify the pressure at the end (bottom or tip) of the horn, where the outlet is located. In the present examples, the ultrasonic horn is exponentially tapered; however, other tapering geometries (e.g., stepped or linearly tapered) may be suitable. As the horn tip is both an antinode and the point of maximum tapering (minimum diameter), it is also the point of maximum displacement, which may reach a magnitude of about 50 microns.

The ultrasonic horn may be operated at an output power of at least about 10 W, determined by calibration of the horn.

The inlet, outlet and interior channel of the flow-through ultrasonic horn may be formed by drilling through the node and the tip of a traditional solid horn until the two bores connect to form a continuous channel. Traditional ultrasonic horns are available from companies such as Sonics & Materials, Inc. (Newtown, Conn.). Flow-through horns are also commercially available from companies such as Branson Ultrasonics Corp. (Danbury, Conn.) and Sonics & Materials, Inc.

Examples

The application of ultrasound to the induction of nucleation of drug crystals is presented in the following examples. The apparatus shown in FIG. 1 was employed for all of the experiments, using a titanium-aluminum alloy flow-through ultrasonic horn (Sonics & Materials VCX750) having a resonance frequency of 20 kHz, a 1 cm$^2$ tip and an outlet diameter of 4 mm. Horn intensities were calibrated by calorimetry with water. A crystallization tube having an outer diameter (OD) of 13 mm was used in each experiment. Each has different solubility characteristics and consequently its own solvent/antisolvent system. Fine particles of several drug materials, including aspirin (acetylsalicylic acid), acetaminophen (also called paracetamol, the active ingredient in Tylenol), and folic acid (vitamin B$_9$), were prepared by antisolvent sonocrystallization. A summary of the solution/antisolvent characteristics and process conditions for the experiments is presented in Tables 1 and 2.

TABLE 1

Solutions Employed in Antisolvent Sonocrystallization Experiments

| Experiment | Drug | Solvent | Concentration of Solution | Solution Flow Rate (mL/min) |
|---|---|---|---|---|
| A | Aspirin | ethanol | 400 mg/mL (2.2M) | 4.5 |
| B | Acetaminophen | ethanol | 100 mg/mL (0.67M) | 2.4 |
| C | Folic acid | sodium bicarbonate aqueous solution | 132 mg/ml (0.3M) | 4.5 |
| D | Folic acid | sodium bicarbonate aqueous solution | 132 mg/ml (0.3M) | 4.5 |
| E | Folic acid | ammonium hydroxide aqueous solution | 75 mg/mL (0.17M) | 6.0 |

TABLE 2

Process Conditions and Results of Antisolvent Sonocrystallization Experiments

| Experiment | Horn Resonance Frequency (kHz) | Horn Output Power (%) | Antisolvent | Antisolvent Flow Rate (mL/min) | Resultant Particle Size |
|---|---|---|---|---|---|
| A | 20 | 50%/ 15 W | purified water | 65 | few hundred nanometers |
| B | 20 | 50%/ 15 W | hexanes | 65 | few microns (platelike) |
| C | 20 | 50%/ 15 W | 1M HCl | 65 | few hundred nanometers |
| D | 20 | 50%/ 15 W | 1M $H_2SO_4$ | 65 | ~5 μm (needles) |
| E | 20 | 50%/ 15 W | acetone | 65 | few hundred nanometers |

Purified (nanopure) water was prepared using a Barnstead NANOpure® ultrapure water purification system, which scrubs for organics, removes particles larger than 200 nm, and deionizes to a resistance greater than 18 MΩ·cm.

Particles were imaged using a Canon PC1015 digital camera attached to a Zeiss Axioskop optical/fluorescence microscope with polarization analyzer or with a Hitachi 4700 SEM. Particle size distributions were measured by dynamic light scattering when possible.

Antisolvent Sonocrystallization of Aspirin

The solubility of aspirin in water is about 3 g/ml at room temperature. A saturated ethanol solution including about 400 mg/mL of aspirin was delivered at a flow rate of about 4.5 mL/min to a flow-through ultrasonic horn prior to dispersion in a continuous flow of nanopure water. A flow-through crystallization tube was used to provide the nanopure water at a flow rate of about 65 mL/min. Experiments were conducted at a horn output power of 15 W.

FIGS. 4A-4I show the sonocrystallization of aspirin as it occurs in the continuous-flow crystallization tube. After exiting from the outlet of the ultrasonic horn, the saturated solution of aspirin in ethanol is ultrasonically dispersed in a continuous flow of water, which is flowing from right to left. The series of images is extracted from a video, where each frame is separated by 3 seconds. The progress is from left to right, starting at the top left-most frame. In the first two frames the horn is operating but no solvent has reached the continuous flow of nanopure water yet; the slight cloudiness is from cavitating bubbles. Crystallization of the aspirin begins in the third frame.

Figure 5B:
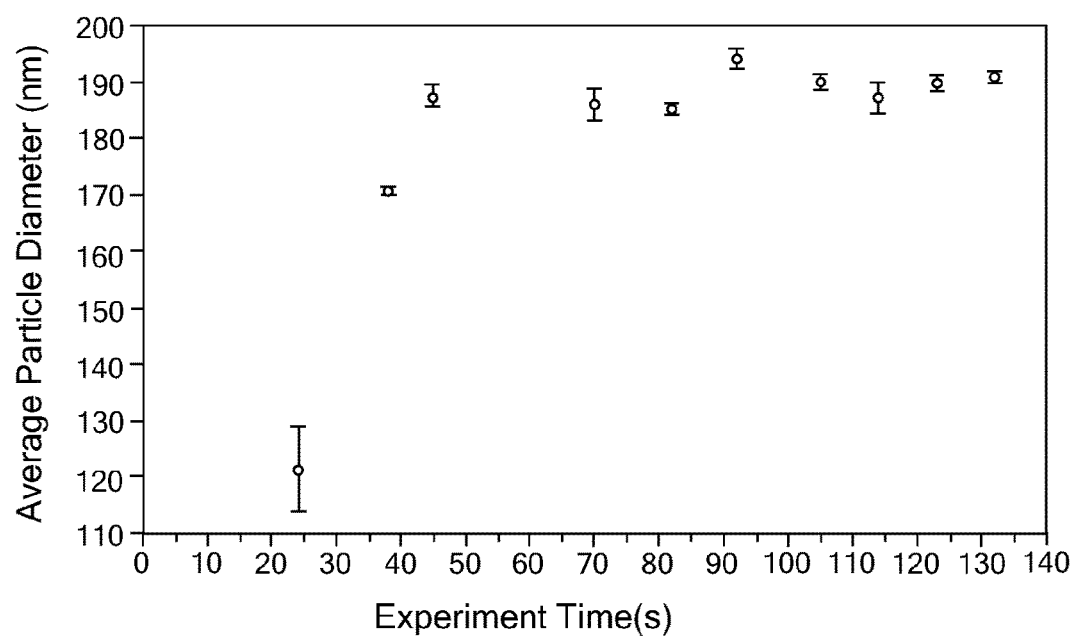
FIG. 5B shows the average particle size of the aspirin as a function of crystallization experiment time.

The solvent/antisolvent concentration profile and the temperature profile reach equilibrium quickly. The time to reach equilibrium may be estimated by determining how long it takes for the particle size distribution to stabilize during the crystallization process. To make this determination, aliquots were collected at fixed intervals and evaluated using dynamic light scattering. FIGS. 5A and 5B show that stabilization of the particle size distribution occurs in less than one minute for a saturated solution (400 mg/mL) of aspirin in ethanol flowing at 2.4 mL/min into nanopure water flowing at 65 mL/min. (Other than the solvent flow rate, the experimental conditions were the same as Experiment A described in Tables 1 and 2.) The particle size distribution is narrow and exhibits extremely little variability throughout the experiment once a steady state has been achieved.

Antisolvent Sonocrystallization of Acetaminophen

Experiments on acetaminophen were performed using a concentration of about 100 mg/mL of acetaminophen in ethanol delivered at a flow rate of about 2.4 mL/min into a flow-through ultrasonic horn. Hexanes were flowed through the crystallization tube at a flow rate of about 65 mL/min. As above, the experiments were conducted at a horn output power of 15 W using a horn with a resonance frequency of 20 kHz.

Acetaminophen generally crystallized slowly, even using antisolvents in which it had extremely low solubility. Ideally, crystallization occurs before dispersed droplets have an opportunity to combine with other droplets or to diffuse uniformly into the antisolvent. Using methylene chloride or toluene as the antisolvent, nucleation was not observed to occur at all in the time frame of the experiment. Only when using hexanes as the antisolvent were crystals (particles) obtained. The acetaminophen crystals were platelike crystals a few microns long in the largest dimension, as shown in FIGS. 6A and 6B, and tended to aggregate in the strongly hydrophobic antisolvent.

Antisolvent Sonocrystallization of Folic Acid

Experiments to produce folic acid particles were carried out using different solvents and antisolvents under various process conditions. One experiment on folic acid was performed using a concentration of about 130 mg/mL of folic acid in a saturated aqueous solution of sodium bicarbonate delivered at a flow rate of about 4.5 mL/min into a flow-through ultrasonic horn; 1 M HCl was employed as the antisolvent and flowed through the crystallization tube at a flow rate of about 65 mL/min. In another experiment, about 130 mg/mL of folic acid in sodium bicarbonate was delivered at a flow rate of about 4.5 mL/min into a flow-through ultrasonic horn, and 1 M HCl was employed as the antisolvent at a flow rate of about 65 mL/min. In another experiment, about 75 mg/mL of folic acid in ammonium hydroxide was delivered at a flow rate of about 6.0 mL/min into a flow-through ultrasonic horn. Acetone was employed as the antisolvent and flowed through the crystallization tube at a flow rate of about 65 mL/min. As above, the experiments were conducted at a horn output power of 15 W using a horn with a resonance frequency of 20 kHz.

Folic acid was found to be a versatile drug, crystallizing readily under a number of solvent/antisolvent schemes, and exhibiting a diversity of possible size distributions and morphologies. Folic acid is very nearly insoluble in neutral to moderately acidic water (it will become quite soluble at very low pH), but dissolves readily in base (as the folate ion). A saturated sodium bicarbonate solution is an excellent solvent and acidic water makes a good antisolvent. The choice of acid made a large difference in particle characteristics; HCl creates particles too small to resolve optically (FIGS. 7A-7B), while $H_2SO_4$ forms large needles (FIGS. 7C-7D). This may again be the result of crystallization kinetics compared to the rate of droplet aggregation or solvent-antisolvent interdiffusion.

In an effort to overcome these obstacles, the solvent/antisolvent system was changed to acetone (in which folic acid has negligible solubility) as the antisolvent and a 20% aqueous ammonium hydroxide solution as the solvent. The product was collected in a large reservoir of antisolvent to dilute any residual solvent to insignificance. Crystals were isolated by repeated centrifugation and rinsing with additional acetone.

Figures 8A, 8B:
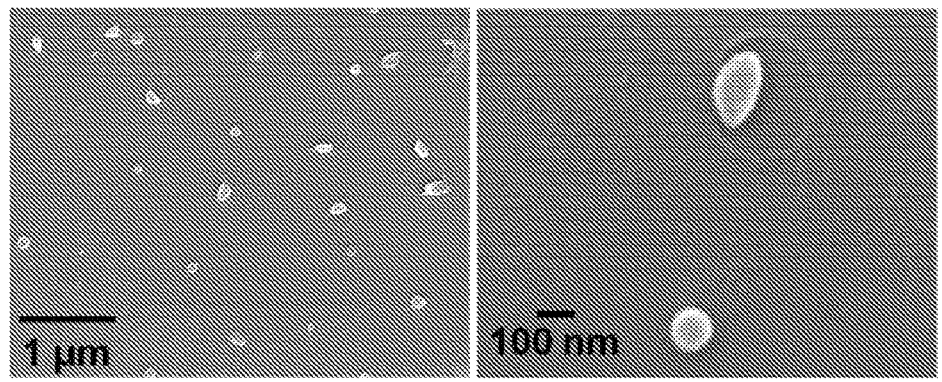
FIGS. 8A-8B show scanning electron microscope (SEM) images of particles of folic acid prepared by antisolvent sonocrystallization in a continuous flow of acetone.
Figure 9:
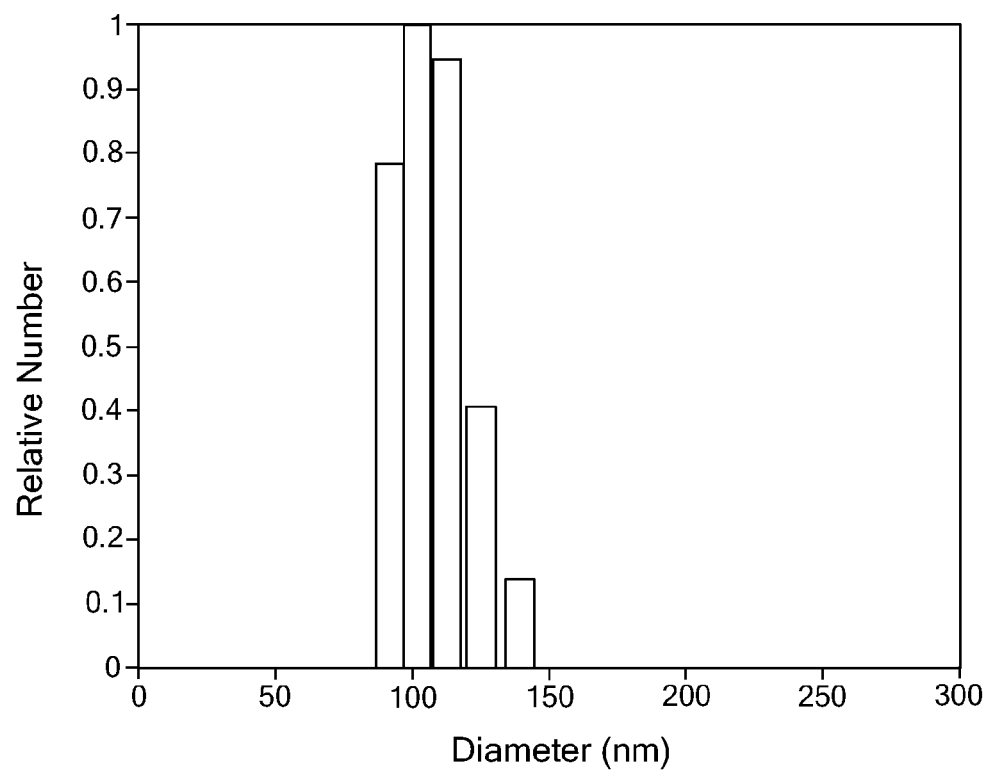
FIG. 9 shows an exemplary particle size distribution obtained from aspirin particles.

This formulation yielded folic acid crystals about 100 nm in diameter, as characterized by SEM (FIGS. 8A-8B).

In summary, antisolvent sonocrystallization has been shown to be a powerful and versatile technique for forming particles from organic substances such as pharmaceutical agents. The ability to produce a variety of different micro- and nanocrystals with this technique has been demonstrated without the need for any surfactant or other templating method. In addition to providing particles having a narrow particle size distribution and well-formed crystals, the sonocrystallization procedure can be extremely simple and facile, and is potentially scalable. It is envisioned that an array of similar devices in a continuous-production operation could permit industrial scale operation.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

It is to be understood that the different features of the various embodiments described herein can be combined together. It is also to be understood that although the dependent claims are set out in single dependent form the features of the claims can be combined as if the claims were in multiple dependent form.

The invention claimed is:

1. A ultrasonic method of forming particles having a controlled size distribution, the ultrasonic method comprising:
   driving an ultrasonic horn at a resonance frequency thereof, the ultrasonic horn comprising an inlet, an outlet and an interior channel connecting the inlet to the outlet for passage of a fluid therethrough;
   delivering a solution comprising a solute and a solvent into the inlet while the outlet is immersed in a continuous flow of antisolvent, the solution flowing through the interior channel and into the antisolvent;
   ultrasonically dispersing the solution in the antisolvent, thereby forming nucleation sites comprising the solute; and
   forming particles comprising the solute at the nucleation sites.

2. The ultrasonic method of claim 1, wherein the solute comprises a first solubility in the solvent and a second solubility in the antisolvent, a ratio of the first solubility to the second solubility being at least about 10:1.

3. The ultrasonic method of claim 2, wherein the ratio of the first solubility to the second solubility is at least about 100:1.

4. The ultrasonic method of claim 1, wherein the solute comprises a pharmaceutical agent, the solution being a drug solution.

5. The ultrasonic method of claim 1, wherein the solution is delivered into the inlet at a flow rate of from about 2 mL/min to about 6 mL/min.

6. The ultrasonic method of claim 1, wherein the continuous flow of antisolvent has a flow rate of from about 25 mL/min to about 85 mL/min.

7. The ultrasonic method of claim 1, wherein the solution and the antisolvent do not contain a surfactant.

8. The ultrasonic method of claim 1, wherein the solvent is substantially miscible in the antisolvent.

9. The ultrasonic method of claim 1, wherein the solvent comprises an organic solvent.

10. The ultrasonic method of claim 1, wherein the antisolvent comprises an aqueous solvent.

11. The ultrasonic method of claim 1, wherein the particles form in a mixing region of the antisolvent adjacent to the outlet of the ultrasonic horn.

12. The ultrasonic method of claim 11, wherein a concentration of the solvent in the mixing region is substantially constant.

13. The ultrasonic method of claim 11, wherein the mixing region is at a substantially constant temperature.

14. The ultrasonic method of claim 1, further comprising removing the particles from the antisolvent downstream of the outlet.

15. The ultrasonic method of claim 1, wherein the particles have an average particle size in the range of from about 0.1 micron to about 10 microns.

16. An ultrasonic apparatus for producing particles having a controlled size distribution, the ultrasonic apparatus comprising:
   a flow-through ultrasonic horn comprising an inlet, an outlet, and an interior channel connecting the inlet to the outlet for flow of a fluid therethrough, the ultrasonic horn being connectable to a transducer; and
   a crystallization tube adjacent to the ultrasonic horn, the crystallization tube comprising an inlet port and outlet port for flow of an antisolvent therethrough and further comprising a side access port, wherein the outlet of the ultrasonic horn is inserted into the side access port so as to be in fluid communication with the crystallization tube.

17. The ultrasonic apparatus of claim 16, wherein the side access port defines an angle θ with respect to the inlet port of the crystallization tube, the angle θ being from about 30° to about 150°.

18. The ultrasonic apparatus of claim 16, further comprising a pump connected to the inlet port of the crystallization tube for driving the antisolvent therethrough, and further comprising a pump connected to the inlet of the ultrasonic horn for driving the solution therethrough.

19. The ultrasonic apparatus of claim 16, wherein the ultrasonic horn comprises more than one inlet.

20. The ultrasonic apparatus of claim 16, wherein the ultrasonic horn comprises more than one outlet.

* * * * *